Dec. 28, 1954 A. W. JOHNSON 2,697,980
ACTUATING MECHANISM FOR FRUIT JUICERS OR THE LIKE
Original Filed Dec. 27, 1950 4 Sheets-Sheet 1
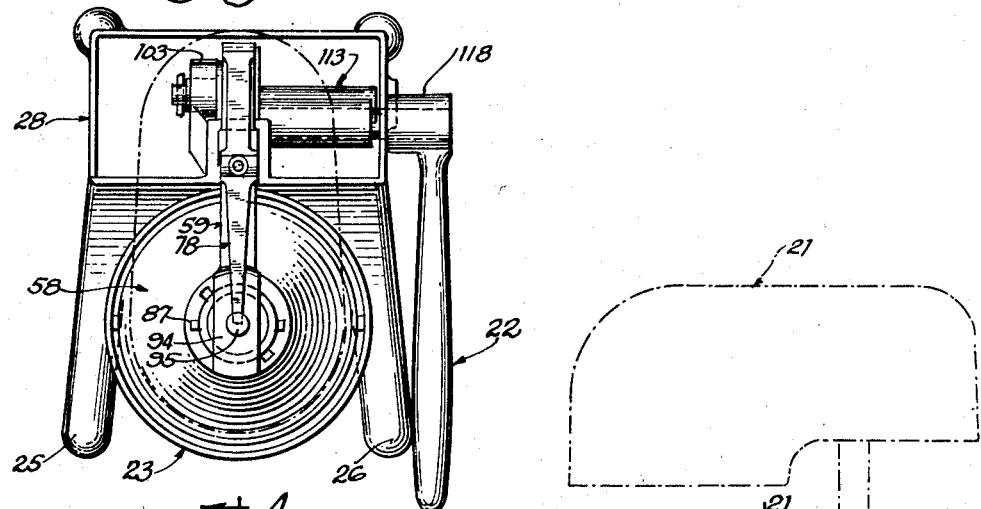
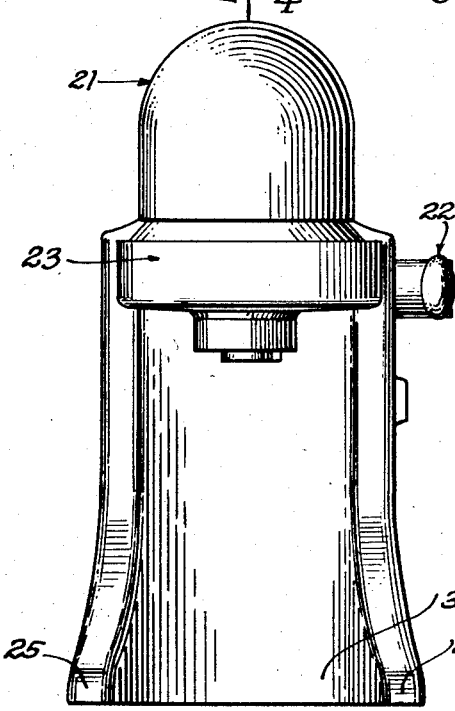
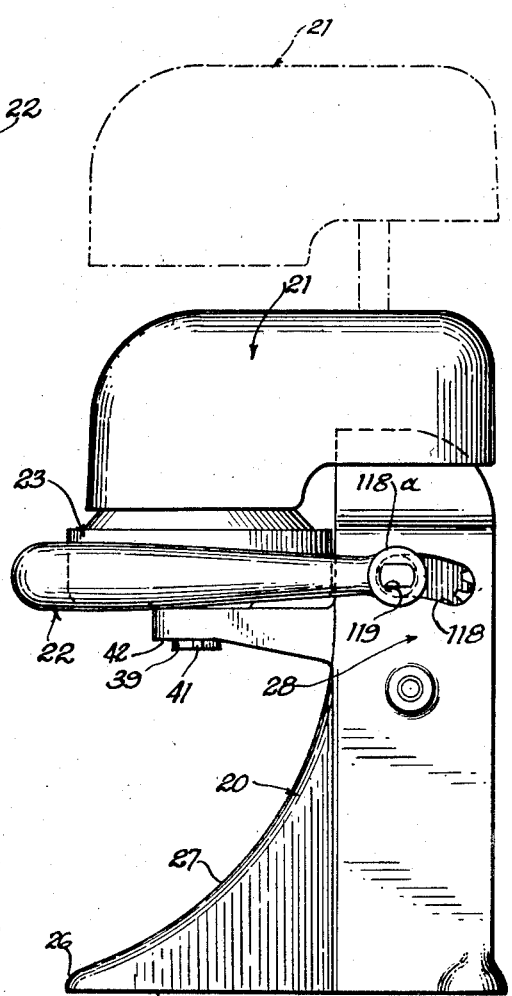
INVENTOR.
Alfred W. Johnson
BY Robert H. Wendt
Attorney Dec. 28, 1954   A. W. JOHNSON   2,697,980
ACTUATING MECHANISM FOR FRUIT JUICERS OR THE LIKE
Original Filed Dec. 27, 1950   4 Sheets-Sheet 3
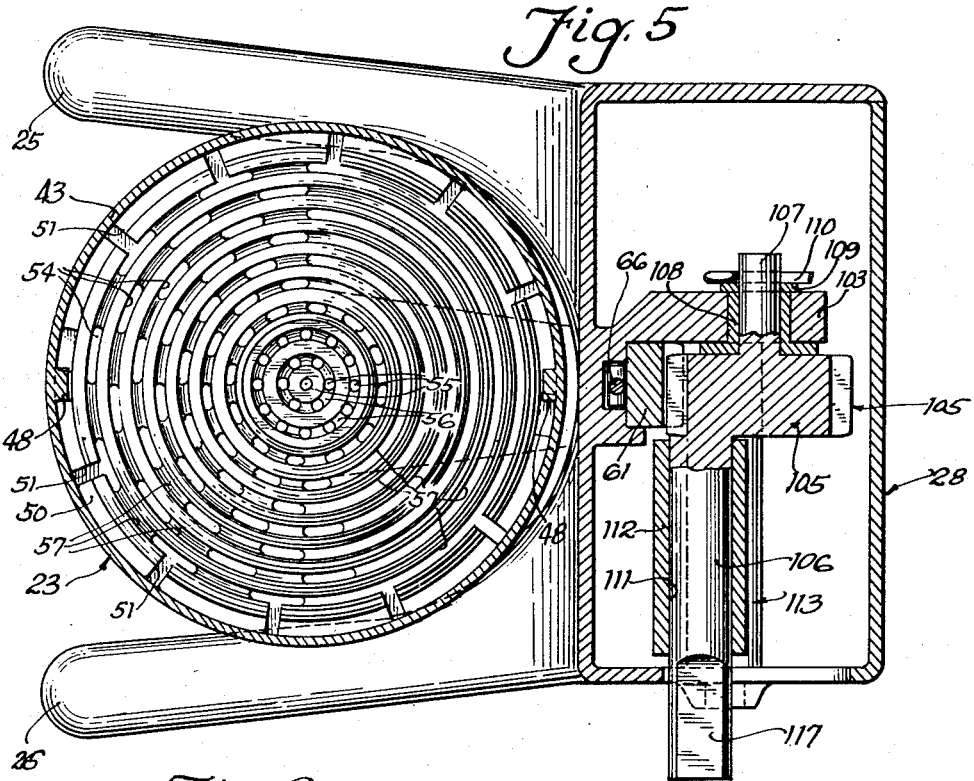
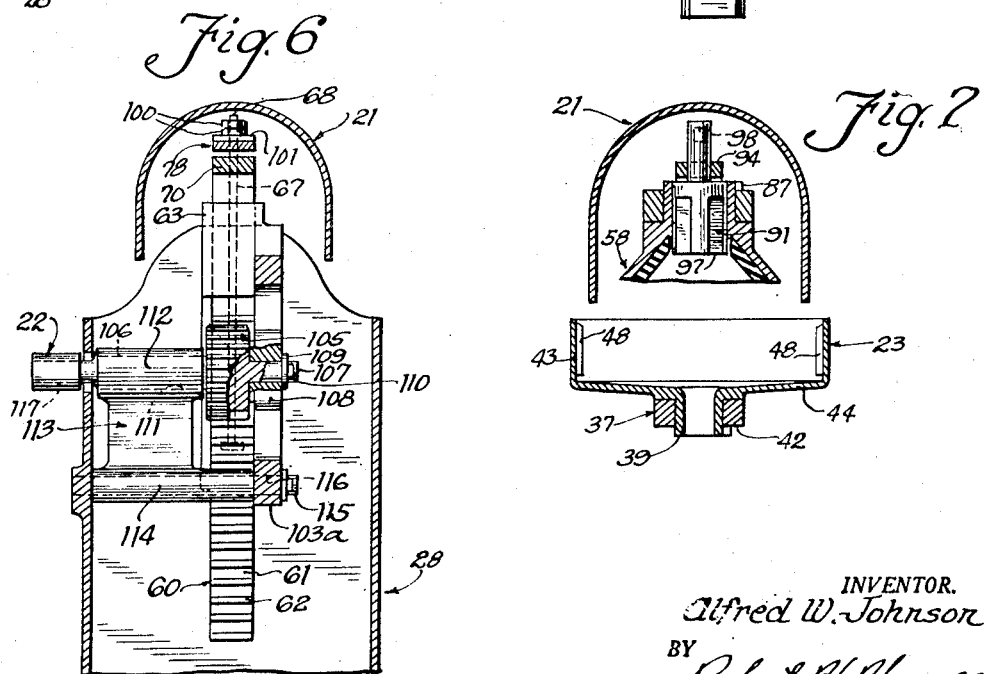
INVENTOR.
Alfred W. Johnson
BY
Robert H. Wendt
Attorney

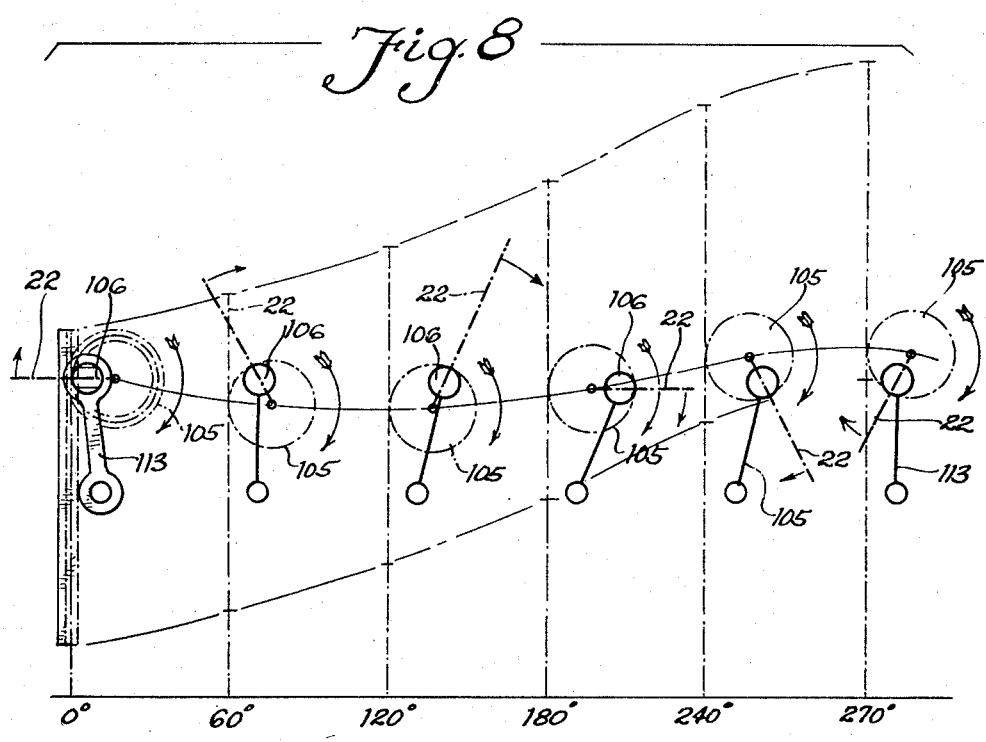

United States Patent Office 2,697,980
Patented Dec. 28, 1954

2,697,980

ACTUATING MECHANISM FOR FRUIT JUICERS OR THE LIKE

Alfred W. Johnson, Chicago, Ill.

Original application December 27, 1950, Serial No. 202,935, now Patent No. 2,624,271, dated January 6, 1953. Divided and this application December 30, 1952, Serial No. 328,682

9 Claims. (Cl. 100—288)

The present invention relates to actuating mechanism for fruit juicers or the like, and is a division of my prior application, Ser. 202,935, filed December 27, 1950, for Fruit Juicers, Patent No. 2,624,271, issued January 6, 1953.

In the fruit juicers of the prior art of the type employing a rack and pinion it is necessary for the operator to spend a certain amount of time in twirling the handle of the pinion shaft in order to bring the pressure cup down into engagement with the fruit, after which he places pressure upon it; and again the handle must be turned a number of times in such prior art devices to separate the pressure cup of the juicer from the rind.

One of the objects of the invention is the provision of an improved fruit juicer having an improved actuating mechanism by means of which the handle is adapted to effect a maximum amount of motion of the pressure cup to bring the cup into engagement with the fruit, and thereafter to exert a maximum amount of force with a minimum amount of movement by means of the same handle, with the handle in the most convenient position for exerting force upon it.

Another object of the invention is the provision of an improved construction and mechanism for fruit juicers or the like by means of which the juicer may be operated more swiftly and with a minimum number of movements on the part of the operator, while still exerting a maximum pressure to extract the juice from the fruit and to remove the previously squeezed rind from the pressure cup.

Another object is the provision of an improved fruit juicer construction which is simple, sturdy, capable of economical manufacture, efficient, and adapted to be used for a long period of time without necessity for repair or replacement of any of its parts.

Another object of the invention is the provision of an improved actuating mechanism adapted to be actuated by a handle which has the inherent capability of effecting a fast motion in the beginning of a stroke to bring two working parts into engagement with each other, and thereafter to accomplish only a minimum amount of motion, but with a maximum amount of force or leverage.

Other objects and advantages of the invention will be apparent from the following description and the accompanying drawings, in which similar characters of reference indicate similar parts throughout the several views.

Referring to the three sheets of drawings accompanying this specification,

Fig. 1 is a top plan view of a fruit juicer embodying my invention with the top cover removed;

Fig. 2 is a front elevational view;

Fig. 3 is a side elevational view;

Fig. 5 is a horizontal sectional view, taken on the plane of the line 5—5 of Fig. 4, looking in the direction of the arrows;

Fig. 6 is a fragmentary sectional view, taken on the plane of the line 6—6 of Fig. 4, looking in the direction of the arrows;

Fig. 7 is a fragmentary sectional view, taken on the plane of the line 7—7 of Fig. 4, looking in the direction of the arrows.

Fig. 8 is a movement diagram of the device of Fig. 4, showing the positions of the crank or handle and the corresponding amount of movement produced in the pressure cup at any point in the rotation of the handle.

Figure 4:
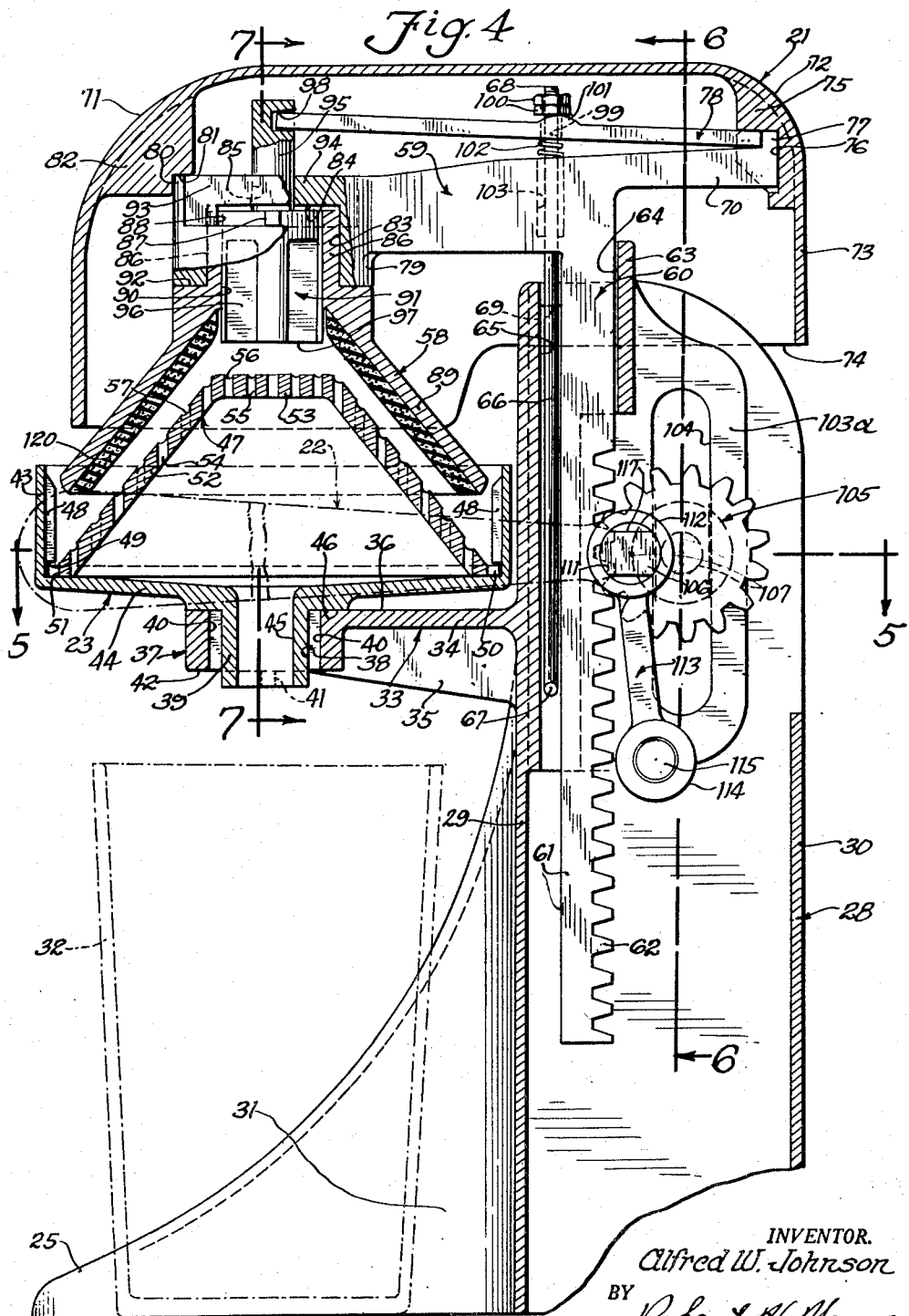
Fig. 4 is a sectional view, taken on the plane of the line 4—4 of Fig. 2, looking in the direction of the arrows.

Referring to Figs. 1 to 3, the present fruit juicer preferably includes a supporting base 20, a top cover 21, an actuating handle 22, and a juice collecting receptacle 23. The base 20 is provided with a lower plane surface 24 and is preferably in the form of a U shaped member at the surface 24, having the forwardly extending tapered side flanges 25, 26, the forward edges of which have a concave curvature at 27, joining with the upwardly extending column 28.

The column 28 may be hollow, as shown in Fig. 4, and provided with a front wall 29 and a back wall 30. The forwardly extending flanges 25, 26 may be spaced sufficiently to provide a U shaped space 31, between which a tumbler 32 may be conveniently located to receive the juice from the juice collector 23.

Immediately above the top of the tumbler 32 the front wall 29 of the column 28 is preferably provided with a cantilever supporting arm 33, comprising a horizontal flange 34 and a vertical reinforcing rib 35, extending forwardly from the column wall 29.

The horizontal flange 34 may have an upper plane surface 36 and may terminate in a vertically open ring 37, having a through bore 38 adapted to receive the discharge tube 39 of the juice collector 23. The bore 38 is circular, but may have a pair of radially extending rectangular slots 40 for passing a rectangular lug 41 carried by the juice collector tube 39 and adapted to hold the juice collector on the arm 33.

The juice collector has its tube 39 passed through the bore 38 with the lug 41 passing down one of the slots 40, after which the juice collector is rotated until its lug 41 engages the lower flat surface 42 of the ring 37, thus retaining the juice collector on the column.

The juice collector 23 may consist of a cast metal cylindrical cup having a cylindrical side wall 43 and a slightly frusto-conical bottom wall 44 draining toward the bore 45 in the discharge tube 39. The bottom has a plane seating surface 46 for engaging the top of the arm 33 at the ring 37.

For the purpose of holding the juicer cone 47 in juice collector 23 the inner surface of cylindrical wall 43 may have one or more longitudinal ribs 48, which terminate short of the bottom 44, leaving a slot at 49 below each rib. The juicer cone 47 preferably has a radially extending flange 50 at its lower end, the flange 50 being provided with slots 51 for passing the ribs 48.

Thus the cone 47 may be secured in the juice collector 23 by sliding the slots 51 over the ribs 48, and thereafter turning the flange 50 under the ends of the ribs 48. The juicer cone 47 preferably consists of a cast metal member of frusto-conical shape, having a conical side wall 52 and a flat top wall 53.

Both of these walls 52, 53 are provided with a multiplicity of vertically extending apertures 54 in the side wall and 55 in the top wall. The top wall apertures 55 are preferably circular, as seen in Fig. 5; but they are also preferably arranged in circles about the center of the cone, and are preferably joined by annular grooves 56, which permit the juice to run from one hole to another, discharging from such holes as may not be bridged by pulp or parts of pulp.

The vertical holes 54 in the side wall 52 are preferably oval, as seen in Fig. 5, and staggered as to location, the oval holes being located according to concentric circular lines, and increasing in length as they are located toward the periphery or bottom of the cone.

These vertical oval holes 54 are also preferably joined by vertical annular grooves 57, which permit the juice to run from one hole to another and to discharge from those holes which are conveniently open and free from pulp.

The pressure cup 58 is carried by a forwardly projecting arm 59 on a vertical rack 60. The rack 60 is preferably rectangular in cross section, having three flat sides 61 and the teeth 62 upon its rear side.

The column 28 has its front wall 29 provided with an integral tubular guide 63 at the upper part of the column, this guide having a rectangular bore 64 which is complementary to the rack 60.

The forward wall of this guide bore 64 has a grooved extension, indicated at 65, which is rectangular in shape, and which provides space for a sliding stop wire or rod 66, for a purpose further to be described. The wire 66 has a laterally bent end portion 67 at its lower end and has a threaded part 68 at its upper end.

The guide groove 65 terminates at the top of the standard 28, leaving only a small aperture for the wire 66, and having inwardly extending shoulders 69 at the upper end of the standard for engaging the laterally turned end 67 on the wire 66, when the rack travels up to this point, for a purpose further to be described. Besides the tubular portion 64 of the guide for rack 60, the column 28 is formed below the tubular portion 63 with three of the walls of the guide 64 engaging and guiding the rack.

At its upper end the rack 60 not only has the forwardly extending arm 59, but also the rearwardly extending arm 70. These two arms support a top cover, indicated at 21; and this top cover may consist of an inverted, elongated cast metal member with rounded corner portions 71, 72, a depending side wall 73, and a bottom opening 74. The size and shape of the side wall 73 is such that it is adapted to embrace the other parts of the juicer without interference in the downward movement of the rack 60 to a position of practically full engagement between the pressure cup 58 and the juicer cone 47.

The top cover adds to the appearance of the assembly and tends to keep dirt and foreign material off all of the parts which it covers. It may be supported in place by providing the side wall 73 with an inwardly extending portion 75 near the upper corner 72.

This thickened portion of the wall has a rectangular socket 76 for receiving the complementary end 77 of the rearwardly extending arm 70. The arm 70 is deeper from top to bottom at its right end, but is made narrower inside the left part of the lever 78, which is a part of the ejector mechanism for the rinds.

The lever 78 has a loose fit in its part of the socket 77 so that it has a limited pivotal movement, but is held aginst horizontal lateral movement.

At its forward end the arm 58 has a substantially cylindrical enlargement 79, the forward upper corner 80 of which is adapted to fit in a complementary downwardly open angular socket 81 in the wall of the cover 21 at the thickened portion 82. The cover socket 81 may have a frictional fit on the end portion 80 of arm 59; and thus the cover is carried by the rack and its arms.

The cylindrical member 79 on arm 59 has a bore 83 which terminates at a flat bearing surface 84 and communicates with a smaller counterbore 85.

The bore 83 is adapted to receive the cylindrical shank 86 of the pressure cup 58, which fits in this bore and is retained in place by a laterally projecting lug 87. The bore 83 is cylindrical, but it has a longitudinal groove for passing the lug 87 on the shank 86; and there is an annular groove 88 at the upper end of bore 83, into which the lug 87 may be rotated to hold the pressure cup 58 on the arm 59.

The pressure cup 58 consists of a substantially frustoconical wall 89, which has the same angularity as that of the cone 47. 120 indicates a lining of porous rubber of conical shape on the inside of the pressure cup 58 for gripping the rind of the citrus fruit and lifting it from the cone 47 after the juice has been extracted.

At its upper end the pressure cup 58 is provided with the tubular shank 66, having a cylindrical bore 90 for guiding an ejector body 91. The upper end of the cone 89 is enlarged and provided with an angular seat 92 for engaging a complementary plane seating surface on the body of the head 79. The head 79 may have its upper parts flatted, as indicated at 93, to save material; and its upper wall 94 is provided with the bore 85, previously mentioned.

The bore 85 slidably receives the cylindrical shank 95 of the ejector 91. The ejector 91 is substantially cylindrical, but may be provided with the flatted sides 96. Its lower end 97 may be plane. The lever 78 of the ejector mechanism has its left end in Fig. 4 in a rectangular socket 98 in the shank 95 of the ejector. At a point intermediate its ends it is provided with a through bore 99 for passing the rod 66, which carries a pair of nuts 100 at its upper end.

The lever 78 may have upwardly curved side flanges 101 for engagement with the nuts. A coil spring 102 may be carried by wire 66 below the lever 78 and may be located in the counterbore 103. This gives the coil spring 102 greater length and greater expansive power. The spring 102 urges the ejector lever 78 upward, which in turn pulls the ejector 91 upward into the position which it has in Fig. 4.

The column 28 has its front wall 29 also provided with the guide flange 103, which is provided with a shaft slot 104.

The rack 60 is driven by means of a pinion 105, which has an integral laterally extending actuating shaft 106; and upon its other side it has a guide shaft 107. The guide shaft 107 may be provided with a bearing bushing 108, a washer 109, and a cotter pin 110.

The guide shaft 107 is concentric with respect to the pinion 105, but the actuating shaft 106 is eccentrically located toward one side of the pinion adjacent the teeth of pinion 105. The actuating shaft 106 has an elongated cylindrical bearing surface 111, which is mounted in the tubular bearing 112 carried by a pivoted link 113.

The pivoted link 113 is in the form of a wide web, carrying the upper bearing 112 and a smaller lower bearing 114, which is provided with a shaft 115 that is pivotally mounted in a bearing aperture 116 in the column flange 103. The end of the actuating shaft 106 may be flatted, as shown at 117; and it projects from the wall of the column through a horizontally extending arcuate slot 118 (Fig. 3).

The necessity for the arcuate slot is brought about by the fact that the position of the shaft 106 is determined by the pivoted link 113 and the other gear elements. The actuating shaft end 117 is provided with an elongated handle 22, having a hub 118, which is provided with an aperture 119 complementary to the flatted end 117 of shaft 106.

Thus the handle 22 is fixedly secured to the shaft 106, with which it rotates; and shaft 106 is fixedly secured to gear 105, which actuates the rack 60.

The supporting flange 103 of column 28 has a vertical slot 104 in which the shaft 107 and its bearing 108 may slide.

Referring to Fig. 8, this is a diagrammatic illustration, in which the handle is shown in six different positions, corresponding to sixty degree intervals. The zero degree position is that of Fig. 3. As the operator lifts the handle 22 with one hand, it passes from the zero degree position to the sixty degree position of Fig. 11; and the handle is in each case indicated by the numeral 22 applied to a dash line.

The handle being integrally attached to the shaft 106 and to pinion 105, it tends to rotate the pinion 105; but this pinion is integrally attached to eccentric shaft 106, which is held down by the link 113. The shaft 106 cannot rise; and therefore pinion 105 must move downward as it rotates and this is shown by the sixty degree position.

The rotation of the pinion, however, tends to move the rack upward; but the net amount of motion of the rack is the difference between the downward movement of the pinion and the movement of the rack relative to the pinion.

In the next 60 degree rotation of handle 22 the shaft 106 moves to the rear slightly in the slot 118 (Fig. 3); and the shaft 106 is now in a position in which the vertical position of pinion 105 does not change much. During this motion, however, the rack is again lifted a predetermined amount by the pinion 105.

During the next sixty degree rotation to the one hundred and eighty degree position the handle 22 moves over to the rearward horizontal position; and as the shaft 106 approaches this position the pinion 105 is elevated at its axis; and it also elevates the rack by an amount which is determined by sixty degrees rotation of the pinion.

During this increment of movement the movement of the juicer head is the additive sum of that caused by the pinion acting on the rack and that caused by the elevation of the pinion itself rotating on the eccentric axis 106.

During the next increment of movement to the two hundred and forty-five degree position of the handle, the handle 22 moves to a depending position; and the gear of pinion 105 is further elevated, also causing the rack to rise another increment.

During this increment of motion the elevating effects which are caused by the gear actuating the rack, and by the gear itself being elevated, are additive. This is a phase during which maximum motion of the juicer head is produced with a minimum motion of the handle.

During the next increment of sixty degrees angular motion of the handle, the handle comes to the two hundred and seventy degree position; and during this motion the shaft 106 tends to rise toward the left of the slot 118 of the column, while the gear or pinion 105 tilts over toward the right of shaft 106; and the link 113 assumes a substantially vertical position.

During this movement the pinion acting on the rack raises the juicer head; but the elevation of the pinion itself is not changed much. During the reverse movement of the handle 22 the juicer head is brought down at a varying rate of speed, which is greatest at the intermediate positions of the handle; but the speed of movement of the juicer head decreases as it finally approaches the juicer cone 47; and in the position of Fig. 3 the handle exerts maximum force, while producing a minimum amount of movement.

Whereas the pinion and rack juicers of the prior art required a twirling of the pinion shaft to elevate the juicer head sufficiently, the present mechanism requires a motion of only two hundred and seventy degrees to lift the juicer head to its maximum elevation. Furthermore, the present mechanism slows up the juicer head's movement as it comes close to the juicer cone, and enables the user to exert a maximum force on the juicer at this point.

The operation of the present juicer is as follows: The handle, gear, and rack are so arranged that when the handle 22 is horizontal, as indicated in Fig. 3, the pressure cup 58 is at its lowermost position, compressing the citrus fruit. In this horizontal position the handle 22 is adapted to be used to exert a maximum force or torque on the shaft 106 because the operator can push harder downwardly than he can in any other direction.

The juicer head rising draws with it the stop rod 66. The pressure cup tends to retain the rind of the citrus fruit. When the laterally turned end 67 of the stop rod 66 engages the stop surface 69, the head continues to move; but the rod 66 pulls the lever 78 downward counterclockwise in Fig. 4, pivoting on that end which is in the socket 76. The lever 78 then snaps the ejector 91 downward, and the flat end of the ejector engages the citrus fruit rind and ejects it downward from the pressure cup 58.

At this time the operator should have his left hand holding a new half orange or lemon above the cone 47 and below the rind which is being ejected from the cone 58. The ejected rind will strike the top of the hand of the user; and as the user moves his hand out from under the pressure cup 58 the rind will be deflected from the juicer and deposited in a suitable container. The direction of its movement can be controlled by turning the handle at this time.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a variable speed and variable pressure actuating mechanism, the combination of a support provided with a longitudinally extending slot, a bearing rotatably mounted in said slot, an integral pinion having a handle shaft and a centrally located stub shaft, said stub shaft being mounted in said bearing, and said handle shaft being eccentrically located on the opposite side of said pinion from that of said stub shaft, an elongated handle carried by said handle shaft and extending in a general diametrical direction, which intersects the axes of said shafts, and a rack slidably mounted on said support, and means carried by said support for movably supporting said pinion in engagement with said rack, the said handle having a range of movement from a lower position behind said pinion to a lower position in front of said pinion, and effecting a fast movement of the rack over the major portion of the stroke of the handle, terminating in a minimum amount of motion of the rack with the forward downward movement of the handle.

2. In a variable speed and variable pressure actuating mechanism, the combination of a support provided with a longitudinally extending slot, a bearing rotatably mounted in said slot, an integral pinion having a handle shaft and a centrally located stub shaft, said stub shaft being mounted in said bearing, and said handle shaft being eccentrically located on the opposite side of said pinion from that of said stub shaft, an elongated handle carried by said handle shaft and extending in a general diametrical direction, which intersects the axes of said shafts, and a rack slidably mounted on said support, and means carried by said support for movably supporting said pinion in engagement with said rack, the said handle having a range of movement from a lower position behind said pinion to a lower position in front of said pinion, and effecting a fast movement of the rack over the major portion of the stroke of the handle, terminating in a minimum amount of motion of the rack with the forward downward movement of the handle, said means for movably supporting the pinion comprising a link pivotally mounted on said support, and having a bearing rotatably supporting said handle shaft.

3. In a variable speed and variable pressure actuating mechanism, the combination of a support provided with a longitudinally extending slot, a bearing rotatably mounted in said slot, an integral pinion having a handle shaft and a centrally located stub shaft, said stub shaft being mounted in said bearing, and said handle shaft being eccentrically located on the opposite side of said pinion from that of said stub shaft, an elongated handle carried by said handle shaft and extending in a general diametrical direction, which intersects the axes of said shafts, and a rack slidably mounted on said support, and means carried by said support for movably supporting said pinion in engagement with said rack, the said handle having a range of movement from a lower position behind said pinion to a lower position in front of said pinion, and effecting a fast movement of the rack over the major portion of the stroke of the handle, terminating in a minimum amount of motion of the rack with the forward downward movement of the handle, the said support comprising a hollow column having a stable base and provided with an inner guide flange having said longitudinally extending slot.

4. In a variable speed and variable pressure actuating mechanism, the combination of a support provided with a longitudinally extending slot, a bearing rotatably mounted in said slot, an integral pinion having a handle shaft and a centrally located stub shaft, said stub shaft being mounted in said bearing, and said handle shaft being eccentrically located on the opposite side of said pinion from that of said stub shaft, an elongated handle carried by said handle shaft and extending in a general diametrical direction, which intersects the axes of said shafts, and a rack slidably mounted on said support, and means carried by said support for movably supporting said pinion in engagement with said rack, the said handle having a range of movement from a lower position behind said pinion to a lower position in front of said pinion, and effecting a fast movement of the rack over the major portion of the stroke of the handle, terminating in a minimum amount of motion of the rack with the forward downward movement of the handle, the said support comprising a hollow column having a stable base and provided with an inner guide flange having said longitudinally extending slot, the said column having one of its side walls provided with an arcuate slot formed on the point of pivot of said link as a radius, for permitting the arcuate movement of said handle shaft as said pinion rotates.

5. In an actuating mechanism for fruit juicers or the like, the combination of a supporting base having a stable bottom surface, and provided with an upwardly extending hollow column, said column having a front wall, a rear wall, and two side walls, an inwardly projecting supporting member carried by said front wall, and extending in a vertical direction, said supporting member being formed with an upwardly and downwardly extending guide for a rack, a rack slidably mounted in said guide, said member having a vertically extending slot spaced from said rack, a bearing member provided with end thrust flanges slidably mounted for vertical motion in said slot, a pinion provided with a centrally located integral shaft located in said bearing, said pinion engaging said rack, and being provided with an eccentrically extending driving shaft, said driving shaft projecting through an arcuate slot in one of said side walls, a link pivotally mounted on said support and having a bearing supporting said drive shaft and an actuating handle carried by said eccentric shaft for rotating said pinion.

6. In an actuating mechanism for fruit juicers or the like, the combination of a supporting base having a stable bottom surface, and provided with an upwardly extending hollow column, said column having a front wall, a rear wall, and two side walls, an inwardly projecting supporting member carried by said front wall, and extending in a vertical direction, said supporting member being formed with an upwardly and downwardly extending guide for a rack, a rack slidably mounted in said guide, said member having a vertically extending slot spaced from said rack, a bearing member provided with end thrust flanges slidably mounted for vertical motion in said slot, a pinion provided with a centrally located integral shaft located in said bearing, said pinion engaging said rack, and being provided with an eccentrically extending driving shaft, said driving shaft projecting through an arcuate slot in one of said side walls, and an actuating handle carried by said eccentric shaft for rotating said pinion, a pintle extending from said supporting member to said latter side wall, and a link pivotally mounted on said pintle and having a bearing at its other end for receiving and rotatably supporting said eccentric shaft.

7. In an actuating mechanism for fruit juicers or the like, the combination of a supporting base having a stable bottom surface, and provided with an upwardly extending hollow column, said column having a front wall, a rear wall, and two side walls, an inwardly projecting supporting member carried by said front wall, and extending in a vertical direction, said supporting member being formed with an upwardly and downwardly extending guide for a rack, a rack slidably mounted in said guide, said member having a vertically extending slot spaced from said rack, a bearing member provided with end thrust flanges slidably mounted for vertical motion in said slot, a pinion provided with a centrally locater integral shaft located in said bearing, said pinion engaging said rack, and being provided with an eccentrically extending driving shaft, said driving shaft projecting through an arcuate slot in one of said side walls, and an actuating handle carried by said eccentric shaft for rotating said pinion, a pintle extending from said supporting member to said latter side wall, and a link pivotally mounted on said pintle and having a bearing at its other end for receiving and rotatably supporting said eccentric shaft, said handle being rotatively oriented on said eccentric shaft so that the handle extends forward when the eccentric shaft is closest to said rack, whereby a further downward movement of the handle may apply a maximum force to said rack.

8. In a variable speed and variable pressure actuating mechanism, the combination of a supporting base provided with a hollow column extending upwardly, said column having an inner supporting flange provided with a guide for slidably supporting a rack, a rack slidably mounted in said guide, said flange also having a vertically extending slot, a bearing provided with a thrust flanges on opposite sides of said flange, said bearing being slidably mounted in said slot, a pinion meshing with said rack and having a stub shaft mounted in said bearing, said pinion having an eccentrically mounted actuating shaft projecting laterally through an arcuate aperture in said column, a third shaft parallel to said actuating shaft and carried by said column and flange, and a link pivotally mounted on said third shaft, and carrying a bearing for supporting said actuating shaft, said actuating shaft effecting a fast movement of the rack over the major portion of the range of rotation of said actuating shaft, terminating in a minimum amount of motion of the rack, with a maximum amount of power at the end of the range of movement of said pinion.

9. In a variable speed and variable pressure actuating mechanism, the combination of a supporting base provided with a hollow column extending upwardly, said column having an inner supporting flange provided with a guide for slidably supporting a rack, a rack slidably mounted in said guide, said flange also having a vertically extending slot, a bearing provided with thrust flanges on opposite sides of said flange, said bearing being slidably mounted in said slot, a pinion meshing with said rack and having a stub shaft mounted in said bearing, said pinion having an eccentrically mounted actuating shaft projecting laterally through an arcuate aperture in said column, a third shaft parallel to said actuating shaft and carried by said column and flange, and a link pivotally mounted on said third shaft, and carrying a bearing for supporting said actuating shaft, said actuating shaft effecting a fast movement of the rack over the major portion of the range of rotation of said actuating shaft, terminating in a minimum amount of motion of the rack, with a maximum amount of power at the end of the range of movement of said pinion, the said actuating shaft being provided with a handle which has a range of movement from a lower position extending beneath said pinion, to a horizontal position extending in front of said pinion.

References Cited in the file of this patent

UNITED STATES PATENTS

| Number | Name | Date |
|---|---|---|
| 1,517,692 | Anderson | Dec. 2, 1924 |
| 1,762,031 | Roberts | June 3, 1930 |
| 2,151,500 | Cecil | Mar. 21, 1939 |
| 2,474,399 | Johnson | June 28, 1949 |
| 2,599,900 | Donohue | June 10, 1952 |